United States Patent
Kitajima et al.

(10) Patent No.: US 7,564,676 B2
(45) Date of Patent: Jul. 21, 2009

(54) ELECTRIC DOUBLE LAYER CAPACITOR, ACTIVATED CARBON FOR ELECTRODE THEREFOR AND METHOD FOR PRODUCING THE SAME

(75) Inventors: Eiji Kitajima, Tokyo (JP); Yuichi Nakano, Tokyo (JP); Kiwamu Takeshita, Tokyo (JP); Keizo Ikai, Yokohama (JP); Tatsuji Maruyama, Yokohama (JP); Hideki Ono, Yokohama (JP); Haruyoshi Mizuta, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 366 days.

(21) Appl. No.: 10/595,409

(22) PCT Filed: Oct. 18, 2004

(86) PCT No.: PCT/JP2004/015366

§ 371 (c)(1),
(2), (4) Date: Apr. 14, 2006

(87) PCT Pub. No.: WO2005/038836

PCT Pub. Date: Apr. 28, 2005

(65) Prior Publication Data

US 2007/0041147 A1 Feb. 22, 2007

(30) Foreign Application Priority Data

Oct. 17, 2003 (JP) .............................. 2003-358045
Oct. 23, 2003 (JP) .............................. 2003-363387
Oct. 23, 2003 (JP) .............................. 2003-363635

(51) Int. Cl.
*H01G 9/00* (2006.01)
(52) U.S. Cl. .................... 361/502; 361/503; 361/504; 361/508; 361/512; 361/523
(58) Field of Classification Search ................ 361/502, 361/503–504, 508–512, 516–519, 523–525, 361/528–529
See application file for complete search history.

(56) References Cited

U.S. PATENT DOCUMENTS 5,926,361 A * 7/1999 Alford ........................ 361/502

(Continued)

FOREIGN PATENT DOCUMENTS

EP 0680 061 A1 11/1995

(Continued)

OTHER PUBLICATIONS

Atsushi Nishino, et al., "Large Capacitance Capacitor Technology and Material II" compiled under the supervision of Atsushi Nishino and Katsuhiko Naoi, CMC Publishing CO., LTD., Jan. 10, 2003, pp. 75-76.

*Primary Examiner*—Nguyen T Ha
(74) *Attorney, Agent, or Firm*—Knobbe Martens Olson & Bear LLP

(57) ABSTRACT

A method for producing activated carbon for electrodes of electric double layer capacitors is disclosed which comprises an activation step wherein activated carbon is obtained by mixing an alkali metal hydroxide with a carbon raw material for the activated carbon and heating the mixture in an inert gas atmosphere, a deactivation removal step wherein the alkali metal in the activated carbon is deactivated and removed, and a heat treatment step wherein the activated carbon having gone through the deactivation removal step is heated in an inert gas atmosphere at a temperature higher than 400° C. but not higher than the heating temperature in the activation step. Also disclosed are activated carbon produced by such a method, activated carbon for electrodes of electric double layer capacitors wherein the alkali metal content is less than 100 mass ppm, activated carbon for electrodes of electric double layer capacitors having specific impedance characteristics, and activated carbon for electrodes of electric double layer capacitors having a specific amount of surface functional groups and a specific amount of surface carboxyl groups. In an electric double layer capacitor comprising a pair of electrodes and an electrolyte solution, at least one of the electrodes contains such an activated carbon.

21 Claims, 1 Drawing Sheet

U.S. PATENT DOCUMENTS

| | | | |
|---|---|---|---|
| 6,038,123 A * | 3/2000 | Shimodaira et al. | 361/502 |
| 6,072,693 A * | 6/2000 | Tsushima et al. | 361/502 |
| 6,402,792 B1 * | 6/2002 | Hiratsuka et al. | 29/25.03 |
| 2002/0096661 A1 | 7/2002 | Shinozaki et al. | |
| 2003/0026753 A1 | 2/2003 | Fujino et al. | |

FOREIGN PATENT DOCUMENTS

| | | | |
|---|---|---|---|
| JP | 63-100009 | | 5/1988 |
| JP | 401241811 A * | | 9/1989 |
| JP | 5-258996 | | 10/1993 |
| JP | 7-302735 | | 11/1995 |
| JP | 9-213590 | | 8/1997 |
| JP | 9-320906 | | 12/1997 |
| JP | 11-214270 | | 8/1999 |
| JP | 11-297577 | | 10/1999 |
| JP | 11-317333 | | 11/1999 |
| JP | 2000-128518 A | | 5/2000 |
| JP | 2001-284188 | | 10/2001 |
| JP | 2002043189 A * | | 2/2002 |
| JP | 2002-83747 | | 3/2002 |
| JP | 2003-86469 | | 3/2003 |
| JP | 2003-104710 A | | 4/2003 |
| JP | 2003-243265 | | 8/2003 |

* cited by examiner

ELECTRIC DOUBLE LAYER CAPACITOR, ACTIVATED CARBON FOR ELECTRODE THEREFOR AND METHOD FOR PRODUCING THE SAME

This application is the U.S. National Phase under 35 U.S.C. §371 of International Application PCT/JP2004/015366, filed Oct. 18, 2004, which claims priority to Japanese Patent Applications No. 2003-358045, filed Oct. 17, 2003, No. 2003-363387, filed Oct. 23, 2003, and No. 2003-363635, filed Oct. 23, 2003. The International Application was not published under PCT Article 21(2) in English.

TECHNICAL FIELD

The present invention relates to an electric double layer capacitor and to activated carbon used in an electrode of the electric double layer capacitor.

BACKGROUND ART

An electric double layer capacitor receives attention as an electric power storage device capable of easily charging and discharging comparatively high power.

As an electrode of an electric double layer capacitor, a carbon electrode mainly made of a carbon material is used, and activated carbon is known as the carbon material. In the electrode containing the activated carbon as a main component, activated carbon with a large specific surface area is used, because electric charge accumulated in an electric double layer formed on the surface of the activated carbon contributes to the capacitance of the electric double layer capacitor.

Activated carbon is produced by activating a carbon material made from a plant such as sawdust and coconut shell, a carbon material made from pitch or coke derived from coal or oil, or a carbon material made from a synthetic polymer such as a phenol resin.

As an activation method, there are known methods such as a steam-activation method of heating a carbon material to from 500 to 1,000° C. in an oxidizing gas containing carbon dioxide or steam, and an alkaline activation method of mixing a raw carbon material with an alkali metal hydroxide and heat-treating the mixture.

In these days when an electric double layer capacitor is expected to further become widespread, further improvement in its performance has been desired.

An important characteristic of an electric double layer capacitor is, for instance, high energy density. It is necessary for obtaining the high energy density that the activated carbon of an electrode material has high capacitance. As such activated carbon, activated carbon formed by activating (alkaline activating) a carbon material made from pitch or coke derived from coal and oil, or a carbon material made from a synthetic polymer such as a phenol resin with an alkali metal hydroxide is reported (Non-Patent Document 1: "Large Capacitance Capacitor Technology and Materials II" compiled under the supervision of Atsushi Nishino and Katsuhiko Naoi, page 76).

An important characteristic of an electric double layer capacitor includes low internal resistance, as well. It is preferable for the electric double layer capacitor to have lower internal resistance. The electric double layer capacitor using activated carbon produced by an alkaline activation method for an electrode material is also expected to further decrease its internal resistance.

Furthermore, an important characteristic of an electric double layer capacitor includes durability as well. As for the durability, Patent Document 1 (Japanese Patent Laid-Open No. 2003-243265) discloses an electric double layer capacitor which is directed at reducing an amount of a gas generated in a capacitor element when energized, and providing an electric double layer capacitor that shows superior reliability for a long period. It is an electric double layer capacitor formed at the contact surface between an electrolytic solution and a sheet-shaped polarizable electrode in which a polarizable electrode layer containing activated carbon powder, an electroconductive material powder and a binder is integrated with a collector foil made of a metallic foil, wherein the amount of surface functional groups of a carboxyl group, a quinone group, a hydroxyl group and a lactone group, which exist on the surface of activated carbon powder, is controlled to 1,000 μmol/g or less.

In addition, Patent Document 2 (Japanese Patent Laid-Open No. 2001-284188) describes that a capacitor tends to lower its durability, when containing much alkali metal left inside the activated carbon electrode. Activated carbon produced by alkaline activation normally contains much alkali metal left therein, so that in order to remove the metal, the activated carbon is washed with water or hydrochloric acid.

[Patent Document 1]: Japanese Patent Laid-Open No. 2003-243265

[Patent Document 2]: Japanese Patent Laid-Open No. 2001-284188

[Non-Patent Document 1]: "Large Capacitance Capacitor Technology and Material II" compiled under the supervision of Atsushi Nishino and Katsuhiko Naoi, page 76

DISCLOSURE OF THE INVENTION

Problems to be Solved by the Invention

As described above, activated carbon activated by alkali metal hydroxide has an advantage of providing larger capacitance than activated carbon activated by steam. However, in an electric double layer capacitor, characteristics such as internal resistance and durability in addition to capacitance are also important, and the electric double layer capacitor is required to improve these characteristics as well.

An object of the present invention is to provide an electric double layer capacitor with improved performance, and specifically, to provide the electric double layer capacitor superior in internal resistance and durability in addition to capacitance.

Another object of the present invention is to provide activated carbon for an electric double layer capacitor electrode capable of providing an electric double layer capacitor having excellent characteristics as described above, and to provide a production method therefor.

Means for Solving the Problems

The present invention provides a method for producing activated carbon for an electric double layer capacitor electrode characterized in that the method comprises:

an activation step of obtaining an activated carbon by mixing a raw carbon material for activated carbon with an alkali metal hydroxide, and heating the mixture in an inert gas atmosphere;

a deactivation and removal step of deactivating and removing alkali metal contained in the activated carbon; and a heat treatment step of heating the activated carbon passed through the deactivation and removal step to a temperature higher than 400° C. and not higher than the heating temperature in the activation step, in an inert gas atmosphere.

It is preferable to set the heating temperature in the heat treatment step to a temperature lower than 750° C.

In the deactivation and removal step, it is preferable to deactivate the alkali metal by reacting the alkali metal with carbon dioxide gas at 200° C. or higher, and/or by washing the activated carbon with water.

It is preferable that the alkali metal hydroxide is potassium hydroxide.

It is preferable that the raw carbon material for activated carbon is graphitizable carbon.

It is preferable that the graphitizable carbon is petroleum coke.

In the activation step, it is preferable to set the heating temperature to higher than 600° C. and lower than 800° C.

It is preferable that the method for producing activated carbon for an electric double layer capacitor electrode further comprises a water washing step of washing the activated carbon passed through the above described heat treatment step with water.

The present invention provides activated carbon for an electric double layer capacitor electrode produced by the above described method.

The present invention provides activated carbon for an electric double layer capacitor electrode, having an alkali metal content of less than 100 mass ppm.

The present invention provides activated carbon for an electric double layer capacitor electrode, having an alkali metal content of less than 100 mass ppm, said activated carbon being produced by the above-described method for producing activated carbon for an electric double layer capacitor electrode including the water washing step.

The present invention provides activated carbon for an electric double layer capacitor electrode characterized in that when forming an electric double layer capacitor including a pair of electrodes prepared by impregnating a circular electrode having a diameter of 16 mm and a thickness of 0.5 mm and consisting of 80 mass % the activated carbon, 10 mass % Ketjen black and 10 mass % polytetrafluoroethylene with an electrolytic solution which is propylene carbonate containing 1 mol/L triethylmethylammonium tetrafluoroborate, and including an separator made of cellulose with a thickness of 50 μm arranged between the two electrodes; measuring alternating current impedance of the electric double layer capacitor at 20° C., with an amplitude of 10 mV centered at 0 V and with changing the frequency from 0.1 Hz to 1 MHz; and plotting the impedance on a complex plane, the absolute value $(-Z_{Im})$ of a negative imaginary part monotonically increases as the value of a real part $(Z_{Re})$ increases, and the impedance has no local maximum point nor local minimum point.

The present invention provides activated carbon for an electric double layer capacitor electrode, characterized in that an amount of surface functional groups is more than 0.2 mmol/g and less than 2 mmol/g, and an amount of a surface carboxyl group is less than 0.1 mmol/g.

In this activated carbon, it is preferable that the activated carbon includes microcrystalline carbon having a lamellar crystal structure similar to graphite, and relationships of the following equations (I) and (II) are satisfied, where A [intensity/g] indicates a peak area of a face (002) in the microcrystalline carbon per unit mass of activated carbon, which is determined by an X-ray diffraction method, and S [m$^2$/g] indicates a specific surface area determined by a nitrogen gas adsorption method.

$$A \times S < 4.0 \times 10^{10} [\text{(Intensity/g)} \cdot (m^2/g)] \quad (I)$$

$$1300 \, [m^2/g] < S < 2400 \, [m^2/g] \quad (II)$$

The present invention provides an electric double layer capacitor having a pair of electrodes and an electrolytic solution, characterized in that at least one of the pair of electrodes includes the above-described activated carbon.

The present invention provides an electric double layer capacitor having a pair of electrodes and an electrolytic solution, characterized in that when alternating current impedance of the electric double layer capacitor is measured at 20° C., with an amplitude of 10 mV centered at 0 V and with changing the frequency from 0.1 Hz to 1 MHz, and the impedance is plotted on a complex plane, the absolute value $(-Z_{Im})$ of a negative imaginary part monotonically increases as the value of a real part $(Z_{Re})$ increases, and the impedance has no local maximum point nor local minimum point.

Advantages of the Invention

The present invention provides an electric double layer capacitor with improved performance, and more specifically, provides an electric double layer capacitor superior in internal resistance and durability in addition to capacitance.

In addition, the present invention provides activated carbon for an electric double layer capacitor electrode capable of obtaining the electric double layer capacitor which is excellent as described above, and a production method therefor.

BEST MODE FOR CARRYING OUT THE INVENTION

Figure 1:
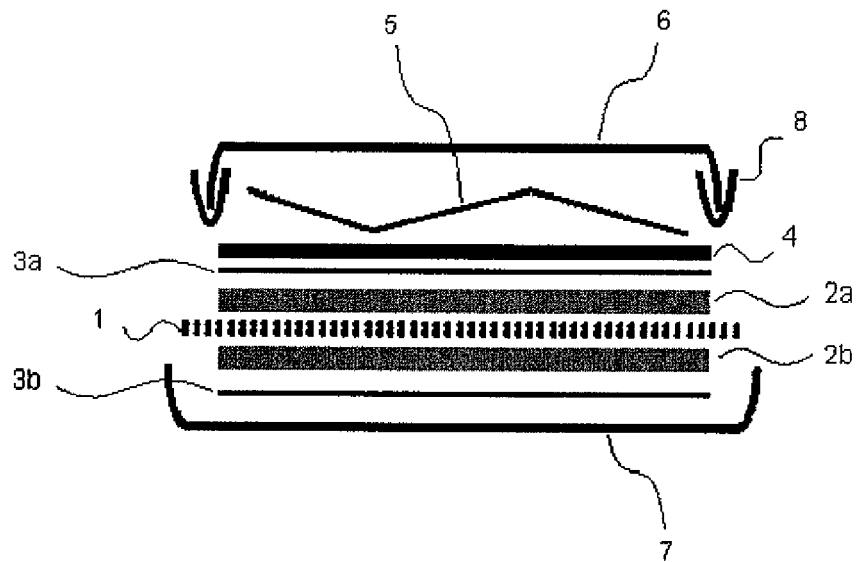
FIG. 1 is a schematic view illustrating a structure of an electric double layer capacitor prepared in an example.

In the method for producing the activated carbon for an electric double layer capacitor electrode according to the present invention, an activation step of obtaining an activated carbon by mixing a raw carbon material for activated carbon with an alkali metal hydroxide, and heating the mixture in an inert gas atmosphere; a deactivation and removal step of deactivating and removing alkali metal contained in the activated carbon; and a heat treatment step of heating the activated carbon passed through the deactivation and removal step to a temperature higher than 400° C. and not higher than the heating temperature in the above described activation step, in an inert gas atmosphere.

[Impedance Characteristic]

Using the activated carbon for an electric double layer capacitor electrode obtained by this method, when forming an electric double layer capacitor including a pair of electrodes prepared by impregnating a circular electrode having a diameter of 16 mm and a thickness of 0.5 mm and consisting of 80 mass % the activated carbon, 10 mass % Ketjen black and 10 mass % polytetrafluoroethylene with an electrolytic solution which is propylene carbonate containing 1 mol/L triethylmethylammonium tetrafluoroborate, and also including an separator made of cellulose with a thickness of 50 μm arranged between the two electrodes; alternating current impedance of the electric double layer capacitor is measured at 20° C., with an amplitude of 10 mV centered at 0 V and with changing the frequency from 0.1 Hz to 1 MHz; and plotting the impedance on a complex plane, the absolute value $(-Z_{Im})$ of a negative imaginary part monotonically increases as the value of a real part $(Z_{Re})$ increases, and the impedance has no local maximum point nor local minimum point.

By using such activated carbon for an electrode material, it is possible to obtain an electric double layer capacitor which shows such an impedance characteristic that when alternating current impedance of the electric double layer capacitor is measured at 20° C., with an amplitude set to 10 mV centered at 0 V and changing the frequency from 0.1 Hz to 1 MHz, and the impedance is plotted on a complex plane, the absolute value $(-Z_{Im})$ of a negative imaginary part monotonically increases as the value of a real part $(Z_{Re})$ increases, and the impedance has no local maximum point nor local minimum point. The electric double layer capacitor having such an impedance characteristic is superior in internal resistance. It is considered that, in the electric double layer capacitor having such an impedance characteristic, ions easily diffuse into the pores of activated carbon included in the electrode, and hence the internal resistance of the electric double layer capacitor decreases.

Accordingly, it is possible to increase the capacitance of an electric double layer capacitor by using activated carbon produced by an alkaline activation method as an electrode material, and it is possible to decrease the internal resistance of an electric double layer capacitor while keeping the high capacitance, by specifying the impedance characteristic of the electric double layer capacitor to that described above.

A method for measuring alternating current impedance is described, for instance, in "Electrochemical Measuring Method" written by Akira Fujishima, et al. and published from Gihodo Shuppan Co., Ltd., in "Basic Electrochemistry" written by Toshiyuki Osakai, et al. and published from Kagaku-dojin Publishing Company, INC, or the like.

[Surface Functional Group]

It can be obtained activated carbon for the electric double layer capacitor electrode wherein an amount of surface functional groups of more than 0.2 mmol/g and less than 2 mmol/g, and an amount of surface carboxyl group of less than 0.1 mmol/g, by setting the heating temperature in the heat treatment step to higher than 400° C. and not higher than the heating temperature in the above described activation step in the above described method for producing activated carbon for the electric double layer capacitor electrode.

There was a case where a conventional electric double layer capacitor generated gas therein when energized and the gas increased the pressure inside the electric double layer capacitor to deform the structure. As a result of a study by the present inventors, it was found that an electric double layer capacitor having used activated carbon derived from petroleum coke for activated carbon in a carbon electrode generates a larger amount of the gas when energized, in comparison with that having used, for instance, activated carbon derived from a phenol resin. Particularly, in such a case, a technology capable of further inhibiting gas generation is demanded. The present inventors also found that not only the amount of the surface functional groups existing on the surface of activated carbon, but also the amount of carboxyl group among the surface functional groups greatly affects the gas generation during energization, and also found that the activated carbon having high crystallinity and a large surface area generates a large amount of the gas during energization, and there is a positive correlation between a product of a peak area of (002) face in a crystal contained in the activated carbon and a specific surface area of the activated carbon and the amount of the generated gas.

By employing the activated carbon for an electric double layer capacitor electrode, which has an amount of a surface functional group and an amount of a surface carboxyl group in the above described ranges, as an electrode material, gas generation due to energization is excellently inhibited, and consequently, an electric double layer capacitor having durability improved can be obtained. By employing this activated carbon, even when it uses graphitizable carbon such as petroleum coke as a raw material, the gas generation is inhibited.

Generally, a structure of a functional group existing on the surface of a carbon material has been researched mainly with a technique of organic chemistry and is assumed to be the structure shown in chemical formulas (a) to (d), which will be shown later. (See, for instance, "Introduction to Carbon Materials [Revised Edition]" edited by The Carbon Society of Japan, page 187).

According to the study by the present inventors, it is only necessary to quantify amounts of surface functional groups showing acidity (except carbonyl or quinone group) among those surface functional groups.

As a method for determining the amount of the surface functional groups, it is possible to quantify the amount of the surface functional groups showing acidity by neutralizing the surface functional groups with various alkalis. As Boehm, H. P. has proposed in [Boehm, H. P.: Adv. In Catalysis., 16, 198 (1996)], the amount of the carboxyl group showing the most strong acidity can be quantified with the use of $NaHCO_3$; the carboxyl group and a lactonic carboxyl group showing weak acidity with the use of $Na_2CO_3$; and the carboxyl group, the lactonic carboxyl group and a phenolic hydroxyl group with the use of NaOH. From these values, each amount of the carboxyl group, the lactonic carboxyl group and the phenolic hydroxyl group can be calculated.

A surface carboxyl group refers to a carboxyl group existing on the surface (including a pore surface) of activated carbon, and exists in a form as is described in Chemical Formula (a). A carboxyl group described in the present invention does not include a lactonic carboxyl group as is shown in Chemical Formula (b). In addition, Chemical Formula (c) shows the form of a phenolic hydroxyl group.

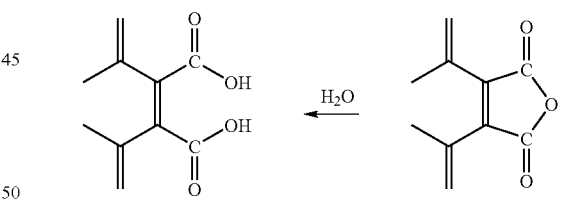

(a) carboxyl group (and anhydrous carboxyl group)

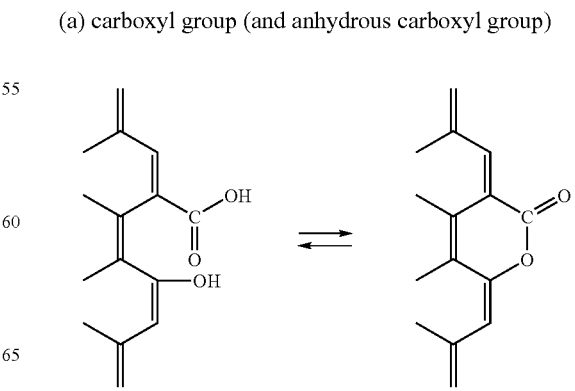

-continued

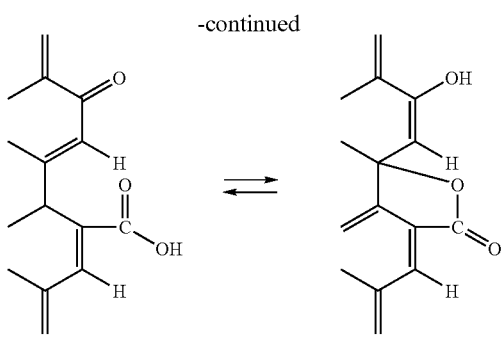

(b) lactonic carboxyl group (and lactone group)

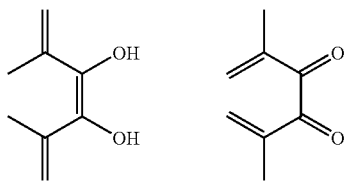

(c) phenolic hydroxyl group (d) carbonyl group or quinone group

It is desirable that the amount of a surface functional group is ideally 0 mmol/g, but activated carbon inevitably contains the surface functional group in an end portion of a carbon skeleton, and activated carbon with a large surface area has the amount of the surface functional group usually of more than 0.2 mmol/g. Thus, this range is preferable from the viewpoint of production easiness. In case that the amount of the surface functional groups is less than 2 mmol/g, and the amount of surface carboxyl group is a specific amount, gas generation can be excellently inhibited.

In case that the amount of surface carboxyl group is less than 0.1 mmol/g (including 0 mmol/g which means that the carboxyl group needs not exist on the surface), preferably less than 0.05 mmol/g, and the amount of surface functional groups is a specific amount, gas generation during energization can be excellently inhibited.

In such activated carbon, when the activated carbon contains microcrystalline carbon having a lamellar crystal structure similar to graphite, and shows relationships of the following equations (I) and (II), where A [intensity/g] is defined as a peak area of a face (002) of the crystallite per unit mass of activated carbon, which is determined by an X-ray diffraction method, and S [m²/g] is defined as a specific surface area determined by a nitrogen gas adsorption method, an electric double layer capacitor employing the activated carbon shows a smaller amount of generated gas due to energization.

$$A \times S < 4.0 \times 10^{10} [(\text{Intensity}/g) \cdot (m^2/g)] \quad (I)$$

$$1300 \, [m^2/g] < S < 2400 \, [m^2/g] \quad (II)$$

Microcrystalline carbon having a lamellar crystal structure similar to graphite refers to carbon in which the condensation layer of a six-membered ring of carbon does not form a regular multilayer such as in graphite, but forms an irregular multilayer though being similar to those in graphite. (see, for instance, [J. Biscoe and B. E. Warren, J. Appl. Phys., 13, 364 (1942)]).

A peak area A [intensity/g] of a (002) face of the crystallite, which is determined from an X-ray diffraction method, is a value converted to the intensity of the peak area per unit mass of the activated carbon, by dividing the intensity of the peak area obtained through measurement on the following conditions, by the mass of activated carbon charged into a measuring sample holder.

<X-ray Diffraction Measurement Conditions>

X-ray source: CuK α, 50 KV and 300 mA, measuring range: 2θ=10 to 90 degree scanning speed: 1 degree/min, slit: DS=½ degree, SS=½ degree and RS=0.15 mm, sample holder: container having a recess with a diameter of 26 mm and the depth of 0.5 mm, which is dug in the center of a cylindrical glass plate with a diameter of 46 mm and the thickness of 3 mm (for filling the recess with activated carbon sample)

A specific surface area S [m²/g] determined by a nitrogen gas adsorption method is a value obtained by converting a surface area determined by a BET method using nitrogen gas as an absorbing agent to the surface area per unit mass of activated carbon.

When A×S (referred to as a crystalline contribution degree) is less than $4.0 \times 10^{10}$ [(intensity/g)(m²/g)], and further preferably less than $2.5 \times 10^{10}$ [(intensity/g)(m²/g)], and the specific surface area is a specific value, gas generation in energization can be excellently inhibited.

When a specific surface area S is preferably 2,400 [m²/g] or less, and further preferably 2,000 [m²/g] or less, and the crystalline contribution degree is a specific value, gas generation in energization can be excellently inhibited.

When an electric double layer capacitor employs activated carbon having a specific surface area S of preferably more than 1,300 [m²/g], and further preferably more than 1,500 [m²/g], it can increase its capacitance.

It is thought that gas generation during energization is caused by a functional group existing on the surface of activated carbon, and is strongly affected particularly by carboxyl group among the functional groups. Accordingly, at first, it is necessary to reduce an amount of the surface carboxyl group. On the other hand, it is thought that the activated carbon has a structure having crystallites with a graphite-similar structure dispersed in amorphous carbon, and it can be assumed that an end of the crystallite has a sharp-pointed structure. The sharp-pointed structure is a part at which an electric field converges and discharge tends to occur, and can be said to be the part at which an electrochemical reaction tends to occur. Accordingly, the more is the number of exposed crystallite ends, the more is an amount of gas generated by the electrochemical reaction. In other words, when the activated carbon has high crystallinity and a large specific surface area, it tends to increase the amount of the generated gas. For this reason, it leads to the control of the number of the exposed crystallite ends which cause gas generation, to control a product A×S of the crystallinity (expressed by the above described peak area A) and the specific surface area S to a specific range.

[Activated Carbon for Electric Double Layer Capacitor Electrode]

A well-known material which can become activated carbon when activated with the use of an alkali metal hydroxide can be used for a raw carbon material for activated carbon. From the viewpoint of the capacitance of an electric double layer capacitor using the activated carbon, the raw carbon material is preferably graphitizable carbon or a carbon material made from a synthetic high polymer such as a phenol resin. By the way, generally, carbon material is broadly divided into graphitizable carbon which acquires a graphite structure when having been heated to a high temperature of about 3,000° C., and non-graphitizable carbon which does not acquire a complete graphite structure (Yuzo Sanada, "Basis of Engineering Carbon", page 19).

From the viewpoint of obtaining an electric double layer capacitor with low internal resistance, it is preferable to use activated carbon derived from graphitizable carbon for an electrode.

Graphitizable carbon can be obtained, for example, by baking an aromatic high molecular compound such as tar, mesophase pitch and polyimide, besides an aliphatic high molecular compound such as a vinyl chloride resin and polyacrylonitrile, at 800° C. or lower. It is also possible to use petroleum coke or coal coke obtained by baking a pitch material such as petroleum pitch and coal pitch, as the graphitizable carbon. Among those, the petroleum coke is preferable from the viewpoint of a cost and internal resistance formed when the activated carbon is used in an electric double layer capacitor.

[Activation Step]

An alkali metal hydroxide to be used in an activating reaction in an activation step includes, for instance, KOH, NaOH, RbOH and CsOH. Among those, KOH is preferable from the viewpoint of an activation effect and electric capacitance shown when the activated carbon is used in an electric double layer capacitor.

An amount of an alkali metal hydroxide to be used can be appropriately selected from a well-known range in alkaline activation for producing activated carbon, but preferably is an equal quantity or more, by a mass basis, with respect to a raw carbon material for the activated carbon from the viewpoint of extent of activation, and preferably is less than three times from the viewpoint of economical efficiency.

In the present invention, a rare gas or a nitrogen gas can be used as an inert gas.

In an activation step, it is preferable to mix a raw carbon material for activated carbon with an alkali metal hydroxide, and heat them to a temperature higher than 600° C. and lower than 1,000° C. The heating temperature is further preferably higher than 600° C. and lower than 800° C. When the heating temperature is lower than 800° C., alkali metal hydroxide is inhibited from vaporizing and pollution due to the alkali metal hydroxide can be effectively prevented. In addition, when the temperature is higher than 600° C., the activated carbon can acquire a desirable surface area for an electric double layer capacitor.

[Deactivation and Removal Step]

An alkali metal formed by an alkaline activation reaction can be deactivated with a well-known method in a process for producing activated carbon. The alkali metal can be deactivated, for instance, by being reacted with carbon dioxide, or by washing the activated carbon with water or acid.

A temperature at which the alkali metal is reacted with carbon dioxide so as to be deactivated is preferably higher than 200° C., is more preferably higher than 300° C., and is further preferably higher than 400° C., from the viewpoint of reactivity. In addition, the temperature is preferably 700° C. or lower from the viewpoint of inhibiting the activated carbon itself from being oxidized by carbon dioxide.

Water washing for deactivation can be appropriately performed with such a well-known method of water washing as is performed after alkaline activation, or is performed after the above described reaction with carbon dioxide, which is performed after the alkaline activation. Acid washing for deactivation can be appropriately performed with an acid washing method well known in the process for producing activated carbon with alkaline activation. The water washing can be repeated in multiple times. The acid washing may be performed before the water washing, and the water washing may be performed after the acid washing after the water washing. As described above, the water washing and the acid washing may be appropriately combined.

As for an acid to be used for acid washing, for instance, hydrochloric acid or acetic acid can be used. These acids are appropriately diluted, and can wash activated carbon.

A deactivated alkali metal can be removed with a method well known in a process for producing activated carbon. The alkali metal removal is performed in order to reduce the alkali metal remaining as an impurity in the activated carbon. For instance, the alkali metal removal can be performed as the same manner as the above described water washing (which may be accompanied by acid washing) for deactivation. The above described water washing can serve as deactivation and removal for the alkali metal.

[Heat Treatment Step]

After a deactivation removal step, a heat treatment step is performed which heats activated carbon to a temperature higher than 400° C. and not higher than the temperature in the activation step, in an inert gas atmosphere.

By performing a heat treatment step, it is possible to reduce the amount of surface functional groups, and particularly the amount of a surface carboxyl group. By heating activated carbon to a temperature higher than 400° C., the surface functional groups and particularly the carboxyl group are effectively removed.

In addition, by heating the activated carbon to a temperature higher than 400° C. in the heat treatment step, it is possible to convert the alkali metal which remains not simply in a physically adsorbed form but in a chemically bonded form into a form which can be more easily removed. Then, the alkali metal can be easily removed in a step of washing it with water, which will be described later. From this viewpoint, the heat treatment temperature is preferably higher than 450° C., and is further preferably higher than 500° C.

In addition, by setting a heat treatment temperature to the temperature in an activation step or lower, pores formed in an activation reaction can be maintained. From this viewpoint, the heat treatment temperature is preferably the activation temperature or lower, more preferably is lower than the activation temperature by 20° C. or more, and further preferably is lower than the activation temperature by 50° C. or more.

A heat treatment temperature is preferably 500° C. or higher, in particular, from the above described viewpoint, and from the viewpoint of maintaining pores, is preferably lower than 750° C. and further preferably 700° C. or lower.

In addition, a heat treatment temperature is not necessarily kept constant but may be changed in the above described range.

Heat treatment is performed in an inert gas atmosphere such as a gaseous nitrogen atmosphere, in order to prevent the weight loss of activated carbon due to oxidation combustion.

A heat treatment period of time can be appropriately determined, and, for instance, can be set at one minute to three hours.

[Water Washing Step]

After a heat treatment step, a water washing step for washing activated carbon with water may be performed. It is preferable to perform the water washing step because an alkali metal in the activated carbon can be removed into a lower level. An electric double layer capacitor employing thus obtained activated carbon as an electrode material has improved durability, because a reaction of the alkali metal and an electrolytic solution is reduced.

It is well known to wash alkali-activated carbon with water. However, as a result of a research, the present inventors found that it is possible to remove alkali metal into a certain level of concentration by repeating only washing the alkali-activated carbon with water or only pickling the activated carbon, but it is difficult to remove the alkali metal into a lower level of concentration. Particularly, an alkali metal remaining in the activated carbon made from a raw carbon material of graphitizable carbon such as petroleum coke could not be reduced to the concentration lower than about 500 mass ppm, even though the water washing or acid washing were repeated on it over and over again by using a conventional technology.

In contrast to this, an alkali metal in alkali-activated carbon can be easily removed into a low level of concentration by being subjected to an alkaline activation step, a deactivation and removal step, a heat treatment step and a water washing step in this order; and it is possible to remove the alkali metal remaining in the alkali-activated carbon into a concentration level as extremely low as less than 100 mass ppm, even when graphitizable carbon such as petroleum coke is used as a raw carbon material for the activated carbon. In addition, when this method is employed, conditions suitable for activation can be adopted in an alkaline activation step without considering the influence of the residual alkali metal, so that flexibility in selecting conditions in the alkaline activation step is broadened, which is considered to contribute to more effective activation than ever. An electric double layer capacitor employing thus prepared activated-carbon in an electrode has high capacitance, superior durability, and besides, superior internal resistance.

In a water washing step, water washing itself can be appropriately performed with a well-known water washing method which is performed after alkaline activation, or after the above described heating in carbon dioxide after alkaline activation. In addition, acid washing may be performed after a heat treatment step and before a water washing step. The acid washing itself can be appropriately performed with a well-known technology in a process for producing activated carbon including alkaline activation. Water washing can be repeated in multiple times. The water washing and the acid washing can be appropriately combined such as the combination of acid washing after water washing and subsequent water washing.

As for an acid to be used for the acid washing, for instance, hydrochloric acid and acetic acid may be used. Activated carbon may be washed with the appropriately diluted acids.

Here, alkali metal can be quantified as described below. Collect an appropriate amount of a sample into a quartz beaker, and ash it in an electric furnace kept at 500° C. After having completely ashed the sample, add from 2 to 3 mL of hydrochloric acid to the sample, cover the beaker with a watch glass, and continue heating to dissolve the ash. Take a dissolved substance in a measuring flask, dilute the dissolved substance and quantify it with an atomic absorption method.

An electrode for an electric double layer capacitor can be produced by using the above described activated carbon, through a well-known process for producing the electrode for the electric double layer capacitor. The electrode can be composed of, for instance, a binding material and an electroconductive material added to the above described activated carbon.

A usable binding material includes, for instance, polytetrafluoroethylene, polyvinylidene fluoride, carboxymethyl cellulose, polyvinyl alcohol and polyacrylic acid; and among those, polytetrafluoroethylene is preferable because when kneaded, it becomes fibrous, consequently strongly binds activated carbon to an electroconductive material, and causes no clogging in pores of the activated carbon.

A usable electroconductive material includes electroconductive carbon black such as acetylene black and Ketjen black; natural graphite; artificial graphite; carbon fiber; and a metallic fiber of aluminum, nickel or the like: and among those, the acetylene black or the Ketjen black is preferable because of effectively improving electro conductivity with a small amount of addition.

An electrode for an electric double layer capacitor can be produced by forming the above described activated carbon, electroconductive material and binding material, by a well-known method. The electrode for the electric double layer capacitor can be produced by, for instance, adding and mixing polytetrafluoroethylene, which is a binding material, with a mixture of activated carbon and carbon black, which is an electroconductive material, and then press forming or roll forming the resultant mixture. In addition, a thin coating film can be obtained by making the above described mixture into a slurry form and coating it. The electrode for the electric double layer capacitor may be a sheet-shaped formed body or a plate-shaped formed body.

The content of activated carbon, the content of an electroconductive material and the content of a binding material in an electrode for an electric double layer capacitor can be appropriately determined.

An electric double layer capacitor having a pair of electrodes and an electrolytic solution can show superior internal resistance and durability in addition to superior capacitance, when the capacitor has a configuration in which at least one of the pair of electrodes contains the above described activated carbon according to the present invention. From the viewpoint of further improving these properties, it is preferable that both the pair of electrodes contain the above described activated carbon according to the present invention.

In addition, an electrolytic solution used in a well-known electric double layer capacitor can be appropriately used for an electrolytic solution in the present invention. However, a water-based electrolytic solution has an electrochemically low decomposition voltage, and the withstand voltage of the resulting capacitor is limited low. Accordingly, an organic-solvent-based (nonaqueous) electrolytic solution is preferable.

A type of an electrolytic solution is not limited in particular, and is generally selected in consideration of solubility of a solute, a degree of dissociation and viscosity of a liquid; and the electrolytic solution preferably has high conductivity and a high potential window (high decomposition-starting voltage).

As for an electrolytic solution, a solution prepared by, for instance, dissolving a quaternary ammonium salt such as tetraethylammonium tetrafluoroborate and triethylmethylammonium tetrafluoroborate in an organic solvent such as propylene carbonate, diethyl carbonate and acetonitrile can be used. A content of a quaternary ammonium salt in the electrolytic solution can be appropriately determined.

As for a structure of an electric double layer capacitor according to the present invention, a structure of a well-known electric double layer capacitor can be appropriately adopted. For instance, the structure may have a pair of electrodes impregnated with an electrolytic solution, and a separator placed between these two electrodes. As for the separator, one used in the well-known electric double layer capacitor can be used.

EXAMPLES

Example 1-1

(Production of Activated Carbon)

An activated substance was obtained by mixing petroleum coke containing 6.5 mass % volatile components with KOH in twice the amount (mass basis) of the petroleum coke, and heat-treating the mixture at 750° C. for one hour in a gaseous-nitrogen atmosphere. Potassium remaining on the surface of the activated substance was deactivated and removed by the steps of: repeating a water washing operation of adding water in 100 times (mass basis) the amount of the activated substance to the activated substance, stirring the liquid for one hour and filtering it, at twice; subsequently adding 0.1 N (normality) hydrochloric acid in 100 times (mass basis) the amount of the activated substance to the activated substance, stirring the liquid for one hour and filtering it; and further subjecting the activated substance to the same water-washing operation as was described above.

Subsequently, the water-washed activated substance was heated to 700° C. from room temperature at a heating rate of 5° C./minute in a gaseous-nitrogen atmosphere, and was cooled down when the temperature of the activated substance had reached 700° C. to obtain activated carbon for an electric double layer capacitor electrode.

(Preparation of Electrode)

The obtained activated carbon in the amount of 0.8 g was mixed with 0.1 g of Ketjen black (made by Lion Corp. with a trade name of Carbon ECP 600JD) and 0.1 g of polytetrafluoroethylene (made by Daikin Industries, Ltd. with a trade name of DAIKIN-PTFE F-104) in a mortar, and the mixture was kneaded therein to be uniformized. Then, an obtained mixture was sandwiched between two triacetate films with a thickness of 0.1 mm, and was rolled into a sheet by passing the sandwiched mixture between nip rolls with a width of 160 mm, a gap between top and bottom rolls of 0.7 mm and an applied pressure of 235 kgf/cm$^2$ (23.0MPa), in 20 times. Two circular discs with a diameter of 16 mm and the thickness of 0.5 mm were stamped out from the rolled sheet, and were dried at 120° C. for two hours in a vacuum dryer, to form an electrode.

(Preparation of Electric Double Layer Capacitor)

The obtained two electrodes were impregnated with an electrolytic solution (propylene carbonate containing 1 mol/L triethylmethylammonium tetrafluoroborate). Then, a cellulose separator with a thickness of 50 μm (made by Nippon Kodoshi Corporation with a trade name of TF40-50) was sandwiched between the two electrodes, and the product was enclosed in a coin cell (made by Hohsen Corporation with a trade name of CR2032) with a diameter of 20 mm made of SUS316. In the above step, a current collector, which was prepared by coating a surface of an aluminum foil with a thickness of 20 μm by a carbon paint for a current collector (made by Nippon Graphite Industries, Ltd. with a trade name of Varniphite T-602D), was sandwiched between the electrode and the cell, so that the coated side can face to the electrode. An electric double layer capacitor was prepared in this way.

A structure of the electric double layer capacitor will be now described with reference to FIG. 1. A used separator 1 is formed of piled two sheets of the above described cellulose separators, and electrodes 2a and 2b are arranged at such a position as to sandwich the separator. Furthermore, aluminum foils 3a and 3b having a carbon paint applied thereon are arranged, at such a position as to sandwich the electrodes. A spacer 4 is arranged at a position of contacting with the aluminum foil 3a, and a washer 5 is further arranged at the position of contacting with the spacer. These components are put in a negative electrode case 6 and a positive electrode case 7. In order to seal and electrically insulate a space between the negative electrode case and the positive electrode case, a gasket 8 is arranged between them. All of the spacer, the washer, the negative electrode case and the positive electrode case were made of stainless steel (SUS316L).

(Measurement of Alternating Current Impedance)

Figure 2:
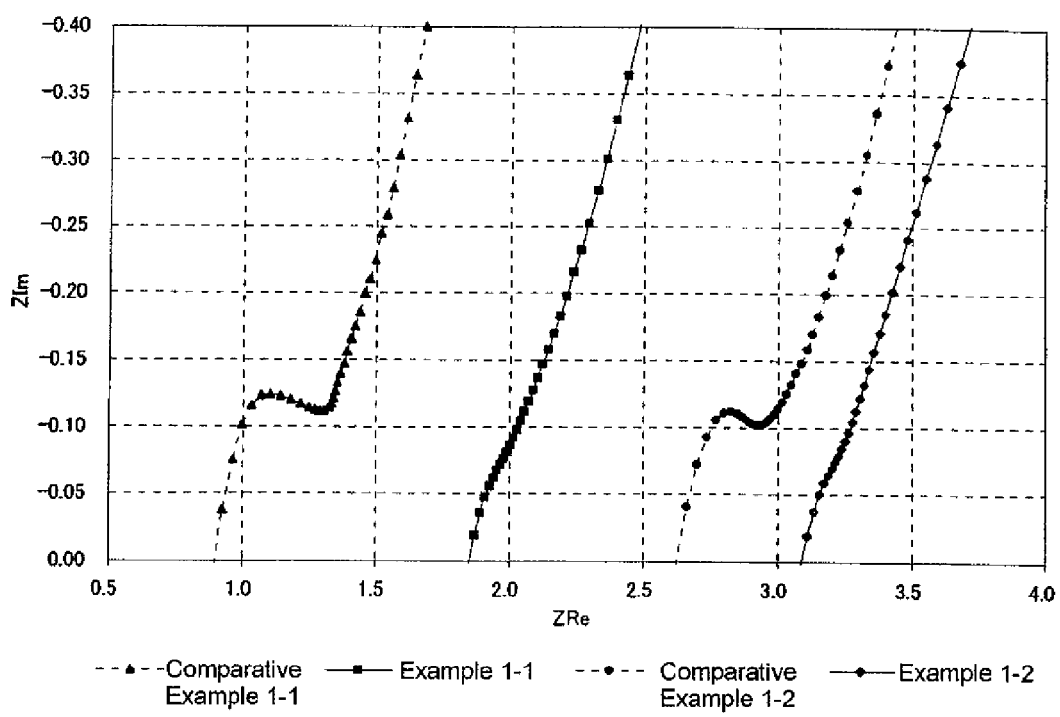
FIG. 2 is a chart showing the impedance of electric double layer capacitors in Examples 1-1 and 1-2 and Comparative Examples 1-1 and 1-2 plotted on a complex plane.

Impedance was measured at 20° C., by using a frequency response analyzer (while using a combination of a product made by Solartron Corporation with a trade name of Frequency Response Analyzer type 1260 and a product made by the same company with a trade name of Potentio/galvanostat type 1287), setting an amplitude at 10 mV around 0 V, and sweeping frequency in a range of 0.1 Hz to 1 MHz. The result was plotted on a complex plane. The result is shown in FIG. 2. In addition, the electric double layer capacitor showed the capacitance per unit volume of activated carbon of 34 F/cm$^3$.

Example 1-2

Activated carbon for an electric double layer capacitor electrode was obtained as in the case of Example 1-1, except that 0.1 N (normality) acetic acid in 100 times (mass basis) the amount of the activated substance was added to the activated substance after the activated carbon had been heat-treated, the liquid was stirred for one hour, filtered and then subjected to the same water-washing operation as in the case of Example 1-1.

Then, an electric double layer capacitor was prepared as in the case of Example 1-1 with the use of the obtained activated carbon, and the alternating current impedance of the capacitor was measured. The result is shown in FIG. 2. In addition, the electric double layer capacitor showed the capacitance per unit volume of activated carbon of 33.5 F/cm$^3$.

Comparative Example 1-1

An electric double layer capacitor was prepared with the use of commercially available activated carbon derived from a phenol resin (product made by The Kansai Coke and Chemicals Co., Ltd. with the trade name of MSP20) as in the case of Example 1-1, and the alternating current impedance was measured. The result is shown in FIG. 2. In addition, the electric double layer capacitor showed the capacitance per unit volume of activated carbon of 27 F/Cm$^3$.

Comparative Example 1-2

Activated carbon for an electric double layer capacitor electrode was obtained as in the case of Example 1-1, except that the petroleum coke was mixed with KOH in 2.5 times the amount (mass basis) of the petroleum coke and NaOH in the equal amount (mass basis) of the petroleum coke, the mixture was heat-treated at 800° C. for one hour in a gaseous-nitrogen atmosphere to provide an activated substance, and the activated substance was not heat-treated at 700° C. after having had been washed with water.

Then, an electric double layer capacitor was prepared as in the case of Example 1-1 with the use of the obtained activated carbon, and the alternating current impedance of the capacitor was measured. The result is shown in FIG. 2.

As for the electric double layer capacitor in the above described example, when the impedance was plotted on a complex plane, the absolute value ($-Z_{Im}$) of a negative imaginary part monotonically increased as the value of a real part ($Z_{Re}$) increased; the impedance curve had no local maximum point nor local minimum point; and the internal resistance was lower than that of the electric double layer capacitor in the above described comparative examples. In addition, the electric double layer capacitor showed the capacitance per unit volume of activated carbon of 30 F/cm$^3$.

Example 2-1

(Production of Activated Carbon)

Petroleum coke particles (with particle sizes of 0.2 mm or smaller) were used as a raw material of activated carbon. The petroleum coke particles in the amount of 1 part by mass were mixed with 2.5 parts by mass of potassium hydroxide (KOH) pellets, and the mixture was charged into a reaction vessel made of nickel and was heated at 750° C. for one hour under a nitrogen gas stream to perform activation.

After the activation step, the reacted mixture in the reaction vessel was cooled to 300° C., and carbon dioxide instead of nitrogen was flowed to deactivate metallic potassium. Subsequently, the reacted mixture was put in water to further deactivate the metallic potassium. Then, the reacted mixture was washed with hydrochloric acid and water. Water washing was repeated until the wash liquid became neutral.

The reacted mixture was heated to 120° C. under a reduced pressure to be dried.

The obtained activated carbon was heated to 700° C. under a nitrogen gas stream to be heat-treated.

(Measurement of Amount of Surface Functional Group)

To the heat-treated activated carbon (1 g), a 0.1 N (normality) aqueous solution of NaHCO$_3$ (50 mL) was added, and the liquid was shaken for 48 hours. Then, the liquid was filtered, and 10 mL of the filtrate was collected. This filtrate was put in 50 mL of water, and was back-titrated with a 0.1 N (normality) aqueous solution of HCl. From a titration value, an amount of a surface carboxyl group was determined. Similarly, the amount of the surface carboxyl group and a surface lactonic carboxyl group was determined by using the 0.1 N (normality) aqueous solution of Na$_2$CO$_3$ (50 mL) for a shaking liquid. Furthermore, similarly, the amount of the surface carboxyl group, a surface lactonic carboxyl group and a phenolic hydroxyl group was determined by using the 0.1 N (normality) aqueous solution of NaOH (50 mL) for a shaking liquid.

(Measurement of Specific Surface Area and Peak Area of (002) Face)

The surface area of the heat-treated activated carbon was measured with a BET method, and a specific surface area S [m$^2$/g] was determined by converting the obtained value to a value per unit mass of the activated carbon.

In addition, a peak area of a (002) face in the heat-treated activated carbon was determined with an X-ray diffraction method, and the above described A [intensity/g] was determined by converting the obtained value to a value per unit mass of the activated carbon.

A was multiplied by S to determine A×S (referred to as a crystalline contribution degree).

A product made by Micromeritics Instrument Corporation with a trade name of ASAP2405 was used as a measuring device for a BET method, and a product made by Rigaku Corporation with a trade name of RINT1400V was used as a measuring device for an X-ray diffraction method.

(Preparation of Electrode)

The activated carbon in the amount of 0.8 g was mixed with 0.1 g of Ketjen black (described above) and 0.1 g of polytetrafluoroethylene (PTFE, described above) in a mortar, and the mixture was kneaded therein to be uniformized. The described mixture was sandwiched between two triacetate films with a thickness of 0.1 mm, and was rolled by passing the sandwiched mixture between nip rolls with a width of 160 mm, a gap between top and bottom rolls of 0.7 mm and an applied pressure of 235 kgf/cm$^2$ (23.0 MPa), in 20 times. Two circular discs with a diameter of 16 mm were stamped out from the rolled sheet to form a carbon electrode. The carbon electrode was dried at 120° C. for two hours in a vacuum dryer.

(Preparation of Electric Double Layer Capacitor)

A cellulose separator (described above) with a thickness of 50 μm was sandwiched between two carbon electrodes impregnated with an electrolytic solution (1M Et$_3$MeNBF$_4$/PC, namely, 1 mol/L Et$_3$MeNBF$_4$ dissolved in propylene carbonate, where Et represents an ethyl group and Me represents a methyl group), and the product was enclosed in a coin cell (described above) with a diameter of 20 mm made of SUS316. In the above step, a current collector, which was prepared by coating a surface of an aluminum foil with a thickness of 20 μm by a carbon paint for a current collector (described above), was sandwiched between the carbon electrode and the cell, so that the coated side can face to the electrode.

The electric double layer capacitor cell prepared as described above was left at 60° C. for 200 hours in a thermostatic chamber as it was, in a state where a voltage of 2.7 V was applied to it.

A degree of swell of the electric double layer capacitor was measured with the use of a strain gauge (made by Kyowa Electronic Instruments Co., Ltd. with a trade name of KFG-3-120-D16-11L1M2S), and the deformed amount of the electric double layer capacitor was determined by the following formula.

Deformed amount of an electric double layer capacitor=Strain amount of strain gauge [με]/Quantity of activated carbon in electrode [g]

Results of the above described example are summarized in Table 1.

Example 2-2

Activated carbon and an electric double layer capacitor were prepared and evaluated as in the case of Example 2-1, except that in the activation step, 1 part by mass of the petroleum coke was mixed with 1.5 parts by mass of potassium hydroxide (KOH) pellets and 1 part by mass of sodium hydroxide (NaOH) pellets, and the mixture was activated at 700° C. The result is shown in Table 1.

Example 2-3

Activated carbon and an electric double layer capacitor were prepared and evaluated as in the case of Example 2-1, except that the activation temperature was set at 700° C. The result is shown in Table 1.

Example 2-4

Activated carbon and an electric double layer capacitor were prepared and evaluated as in the case of Example 2-1, except that the heat treatment temperature was set at 600° C. The result is shown in Table 1.

Example 2-5

Activated carbon and an electric double layer capacitor were prepared and evaluated as in the case of Example 2-1, except that in the activation reaction, 1 part by mass of the petroleum coke was mixed with 1.5 parts by mass of potassium hydroxide (KOH) pellets and 1 part by mass of sodium hydroxide (NaOH) pellets, the activation temperature was set at 650° C., and the heat treatment temperature was set at 600° C. The result is shown in Table 1.

unit volume of activated carbon, by calculating capacitance from energy during discharge and the equation of $W=CV^2/2$, dividing the value by a mass of the activated carbon in the electrode, and further multiplying the result by the bulk density of the electrode, the value was 36.6 F/cm$^3$. Here, C represents capacitance, W represents energy during discharge, and V represents charging voltage.

(Measurement of Durability)

Subsequently, the above described capacitor was subjected to an endurance test of holding it in a thermostatic chamber kept at 60° C. for 200 hours, in a state where a voltage of 2.7

TABLE 1

| Example No. | Amount of surface functional group (mmol/g) | | | | A $10^6$ intensity/g | S m$^2$/g | A × S $10^{10}$ intensity m$^2$/g$^2$ | Deformed amount of capacitor μe/mg | Capacitance of capacitor F/cm$^3$-carbon |
|---|---|---|---|---|---|---|---|---|---|
| | Carboxyl group | Lactonic carboxyl group | Phenolic hydroxyl group | Total amount | | | | | |
| 2-1 | 0.007 | 0.220 | 0.360 | 0.587 | 8.73 | 1890 | 1.65 | 2.82 | 34.9 |
| 2-2 | 0.074 | 0.167 | 0.749 | 0.990 | 8.64 | 1953 | 1.69 | 2.83 | 30.9 |
| 2-3 | 0.003 | 0.232 | 0.476 | 0.711 | 12.0 | 1930 | 2.32 | 3.38 | 30.3 |
| 2-4 | 0.070 | 0.247 | 0.535 | 0.852 | 11.4 | 1925 | 2.19 | 2.99 | 32.2 |
| 2-5 | 0 | 0.100 | 0.224 | 0.324 | 19.7 | 1383 | 2.72 | 3.99 | 31.6 |

Example 3-1

(Production of Activated Carbon)

An activated substance was obtained by mixing petroleum coke containing 6.5 mass % of a volatile component with KOH in twice the amount (mass basis) of the petroleum coke, and heat-treating the mixture at 750° C. for one hour in a gaseous-nitrogen atmosphere. The water washing operation of adding water in 100 times the amount (mass basis) of the activated substance to the activated substance, stirring the liquid for one hour and filtering it was repeated at twice, to deactivate and remove potassium remaining on the surface of the activated substance. Subsequently, the water-washed activated substance was heated to 700° C. and was cooled, in the gaseous-nitrogen atmosphere. Then, the activated substance was again subjected to the same water-washing operation as described above to form activated carbon for an electric double layer capacitor electrode.

As a result of having had measured a quantity of potassium remaining in the obtained activated carbon, the concentration was as extremely low as 70 mass ppm.

(Production of Electrode)

Two sheets of electrodes were prepared as in the case of Example 1-1, while using the above described activated carbon which had been pulverized into an average particle diameter of 10 μm.

(Assembly of Capacitor)

An electric double layer capacitor was obtained as in the case of Example 1-1, while using the above described electrode.

(Measurement of Capacitance)

The capacitance of the electric double layer capacitor was measured by charging the above described coin-shaped cell to 2.7 V at a constant current of 10 mA per 1 F, then holding it for 12 hours, and then discharging it at a constant current of 10 mA. As a result of having had determined the capacitance per V was applied to it. After a lapse of 200 hours, the capacitor was taken out from the thermostatic chamber, and the capacitance was measured again with the above described method. A result of having measured the rate of decrease of the capacitance before and after the durability test is shown in Table 2.

Example 3-2

The same activated substance as that of Example 3-1 was cleaned as in the case of the water washing operation in Example 3-1; 0.1 N (normality) hydrochloric acid in 100 times the amount (mass basis) of the activated substance was added to the activated substance; the liquid was stirred for one hour and cleaned; and the activated substance was further subjected to the same water-washing step as described above. The water-washed substance was heated to 700° C. and cooled in a gaseous-nitrogen atmosphere, and then washed again with water. As a result of having had measured a quantity of potassium remaining in thus treated activated carbon, the concentration was as extremely low as 45 mass ppm. Using this activated carbon containing a low concentration of potassium, an electric double layer capacitor was prepared and subjected to the durability test as in the case of Example 3-1. The rate of decrease of the capacitance is shown in Table 2.

Comparative Example 3-1

The same activated substance as in Example 3-1 was subjected to the same water-washing operations as in Example 3-1 in three times, to remove potassium remaining on the surface of the activated substance. As a result of having had measured a quantity of potassium remaining in thus treated activated carbon, the concentration was 1,500 mass ppm. Using this activated carbon, an electric double layer capacitor was prepared and subjected to the durability test as in the case of Example 3-1. The rate of decrease of the capacitance is shown in Table 2.

Comparative Example 3-2

The same activated substance as in Example 3-1 was washed with the same method as the water washing operation in Example 3-1, was washed with 0.1 N (normality) hydrochloric acid as in the case of Example 3-2, and was further subjected to the same water-washing operations as described above, at twice. As a result of having had measured a quantity of potassium remaining in thus treated activated carbon, the concentration was 350 mass ppm. Using this activated carbon, an electric double layer capacitor was prepared and subjected to the durability test as in the case of Example 3-1. The rate of decrease of the capacitance is shown in Table 2.

Comparative Example 3-3

Activated carbon obtained as in the case of Comparative Example 3-2, (which had been subjected to water washing, acid washing, and water washing at twice) was heat-treated at 700° C. in a gaseous-nitrogen atmosphere. As a result of having had measured a quantity of potassium remaining in thus treated activated carbon, the concentration was 340 mass ppm, which was approximately the same value as in Comparative Example 3-2. Using this activated carbon, an electric double layer capacitor was prepared and subjected to the durability test as in the case of Example 3-1. The rate of decrease of the capacitance is shown in Table 2.

Example 3-3

A carbon material was activated on the same conditions as in Example 3-1, but after having finished the activation step, when a temperature in a furnace became 450° C. before taking activated carbon out from the furnace, carbon dioxide gas was introduced into the furnace to react an alkali metal on an activated substance with it to convert the alkali metal into an alkali metal carbonate. Water washing operations of adding water in 100 times the amount (mass basis) of the activated substance to the activated substance, stirring the liquid for one hour and filtering it was repeated at twice, to remove the alkali metal carbonate remaining on the surface of the activated substance. Subsequently, the water-washed activated substance was heated to 700° C. and was cooled, in the gaseous-nitrogen atmosphere. Then, the activated substance was again subjected to the same water-washing operation as described above to obtain activated carbon for an electric double layer capacitor electrode. As a result of having had measured a quantity of potassium remaining in thus treated activated carbon, the concentration was as extremely low as 95 mass ppm. Using this activated carbon containing a low concentration of potassium, an electric double layer capacitor was prepared and subjected to the durability test in the same method as in the case of Example 3-1. The rate of decrease of the capacitance is shown in Table 2.

TABLE 2

|  | Decrease rate of capacitance |
|---|---|
| Example 3-1 | 8.0% |
| Example 3-2 | 6.5% |
| Example 3-3 | 8.2% |
| Comparative Example 3-1 | 21.8% |
| Comparative Example 3-2 | 17.3% |
| Comparative Example 3-3 | 17.0% |

The invention claimed is:

1. A method for producing activated carbon for an electric double layer capacitor electrode characterized in that the method comprises:
    an activation step of obtaining an activated carbon by mixing a raw carbon material for activated carbon with an alkali metal hydroxide, and heating the mixture in an inert gas atmosphere;
    a deactivation and removal step of deactivating and removing alkali metal contained in the activated carbon; and
    a heat treatment step of heating the activated carbon passed through the deactivation and removal step to a temperature higher than 400° C. and not higher than the heating temperature in the activation step, in an inert gas atmosphere.

2. The method according to claim 1, wherein the alkali metal is deactivated in the deactivation and removal step by reacting the alkali metal with carbon dioxide gas at 200° C. or higher, and/or by washing the activated carbon with water.

3. The method according to claim 1, wherein the alkali metal hydroxide is potassium hydroxide.

4. The method according to claim 1, wherein the raw carbon material for activated carbon is graphitizable carbon.

5. The method according to claim 4, wherein the graphitizable carbon is petroleum coke.

6. The method according to claim 4, wherein the heating temperature in the activation step is set at a temperature higher than 600° C. and lower than 800° C.

7. The method according to claim 1, further comprising a water washing step of washing the activated carbon passed through the heat treatment step with water.

8. Activated carbon for an electric double layer capacitor electrode, having an alkali metal content of less than 100 mass ppm, said activated carbon being produced by the method according to claim 7.

9. Activated carbon for an electric double layer capacitor electrode produced by the method according to claim 1.

10. The activated carbon for an electric double layer capacitor electrode according to claim 9, wherein
    the activated carbon have an alkali metal content of less than 100 mass ppm.

11. An electric double layer capacitor having a pair of electrodes and an electrolytic solution, characterized in that at least one of the pair of the electrodes includes the activated carbon according to claim 10.

12. A method for producing activated carbon for an electric double layer capacitor electrode characterized in that the method comprises:
    an activation step of obtaining an activated carbon by mixing a raw carbon material for activated carbon with an alkali metal hydroxide, and heating the mixture in an inert gas atmosphere;
    a deactivation and removal step of deactivating and removing alkali metal contained in the activated carbon; and
    a heat treatment step of heating the activated carbon passed through the deactivation and removal step to a temperature higher than 400° C. and lower than 750° C., in an inert gas atmosphere.

13. The method according to claim 12, wherein the alkali metal is deactivated in the deactivation and removal step by reacting the alkali metal with carbon dioxide gas at 200° C. or higher, and/or by washing the activated carbon with water.

14. The method according to claim 12, wherein the alkali metal hydroxide is potassium hydroxide.

15. The method according to claim 12, wherein the raw carbon material for activated carbon is graphitizable carbon.

16. The method according to claim 15, wherein the graphitizable carbon is petroleum coke.

17. The method according to claim 15, wherein the heating temperature in the activation step is set at a temperature higher than 600° C. and lower than 800° C.

18. The method according to claim 12, further comprising a water washing step of washing the activated carbon passed through the heat treatment step with water.

19. Activated carbon for an electric double layer capacitor electrode produced by the method according to claim 12.

20. Activated carbon for an electric double layer capacitor electrode, having an alkali metal content of less than 100 mass ppm, said activated carbon being produced by the method according to claim 18.

21. An electric double layer capacitor having a pair of electrodes and an electrolytic solution, characterized in that at least one of the pair of the electrodes includes the activated carbon according to claim 19.

\* \* \* \* \*